United States Patent
Hsieh

(10) Patent No.: US 11,303,313 B2
(45) Date of Patent: Apr. 12, 2022

(54) INTERFERENCE CANCELLATION CIRCUIT AND ASSOCIATED INTERFERENCE CANCELLATION METHOD

(71) Applicant: Realtek Semiconductor Corp., HsinChu (TW)

(72) Inventor: Chih-Nung Hsieh, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 17/146,500

(22) Filed: Jan. 12, 2021

(65) Prior Publication Data
US 2021/0226655 A1 Jul. 22, 2021

(30) Foreign Application Priority Data
Jan. 21, 2020 (TW) ................................ 109102111

(51) Int. Cl.
*H04B 1/10* (2006.01)
(52) U.S. Cl.
CPC ................................ *H04B 1/1018* (2013.01)
(58) Field of Classification Search
CPC .............. H04B 1/10; H04B 1/1027; H04B 2001/0425; H04B 1/04; H04B 1/16; H04B 1/06; H04B 1/1036
See application file for complete search history.

(56) References Cited

U.S. PATENT DOCUMENTS

| 5,664,011 A | * | 9/1997 | Crochiere | ............. | H04M 9/082 379/406.08 |
| 2015/0042406 A1 | * | 2/2015 | Kovac | ....................... | H03F 3/19 330/297 |
| 2017/0019929 A1 | * | 1/2017 | Wang | ............... | H04W 74/0833 |

FOREIGN PATENT DOCUMENTS

| CN | 101651653 A | 2/2010 |
| CN | 102811190 A | 12/2012 |
| TW | 200818792 | 4/2008 |

OTHER PUBLICATIONS

Office action dated Dec. 17, 2021 for CN application No. 202010075372.6, filing date: Jan. 22, 2020, pp. 1~9.

* cited by examiner

*Primary Examiner* — Nhan T Le
(74) *Attorney, Agent, or Firm* — Winston Hsu

(57) ABSTRACT

The present invention provides an interference cancellation circuit, wherein the interference cancellation circuit includes a PAPR detection circuit, a control circuit and a filter. In the operations of the interference cancellation circuit, the PAPR detection circuit is configured to detect a PAPR of a signal in a spectrum in a real-time manner to generate a detection result. The control circuit is configured to generate a control signal according to the detection result. The filter is configured to determine a filtering frequency point of the filter according to the control signal, and to filter the signal to generate an output signal.

15 Claims, 6 Drawing Sheets

INTERFERENCE CANCELLATION CIRCUIT AND ASSOCIATED INTERFERENCE CANCELLATION METHOD

BACKGROUND OF THE INVENTION

1. Field of the Invention

The present invention relates to an interference cancellation circuit, and more particularly, to a single-tone interference cancellation circuit.

2. Description of the Prior Art

In a receiving circuit applied to wireless communication, an interference cancellation circuit is usually provided to eliminate or suppress interference in a received signal. However, if the interference is detected and eliminated in a frequency domain, since detection results of multiple blocks need to be used for interference cancellation, if the interference changes (for example, the frequency or intensity of the interference changes), these changed interference signals cannot be eliminated in real time. Particularly, in some cases, if the received signal has single-tone interference whose frequency moves quickly, the problem that the interference signal cannot be eliminated immediately after the change will be more serious.

SUMMARY OF THE INVENTION

It is therefore an objective of the present invention to provide an interference cancellation circuit, which can detect and eliminate single-tone interference quickly and effectively, to solve the above-mentioned problems.

According to one embodiment of the present invention, an interference cancellation circuit is disclosed, wherein the interference cancellation circuit comprises a peak-to-average power ratio (PAPR) detection circuit, a control circuit and a filter. In the operations of the interference cancellation circuit, the PAPR detection circuit is configured to detect a PAPR of a signal in a spectrum in a real-time manner to generate a detection result. The control circuit is configured to generate a control signal according to the detection result. The filter is configured to determine a filtering frequency point of the filter according to the control signal, and to filter the signal to generate an output signal.

According to another embodiment of the present invention, an interference cancellation method comprises the steps of: detecting a PAPR of a signal in a spectrum in a real-time manner to generate a detection result; generating a control signal according to the detection result; and determine a filtering frequency point of a filter according to the control signal; and filtering the signal to generate an output signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
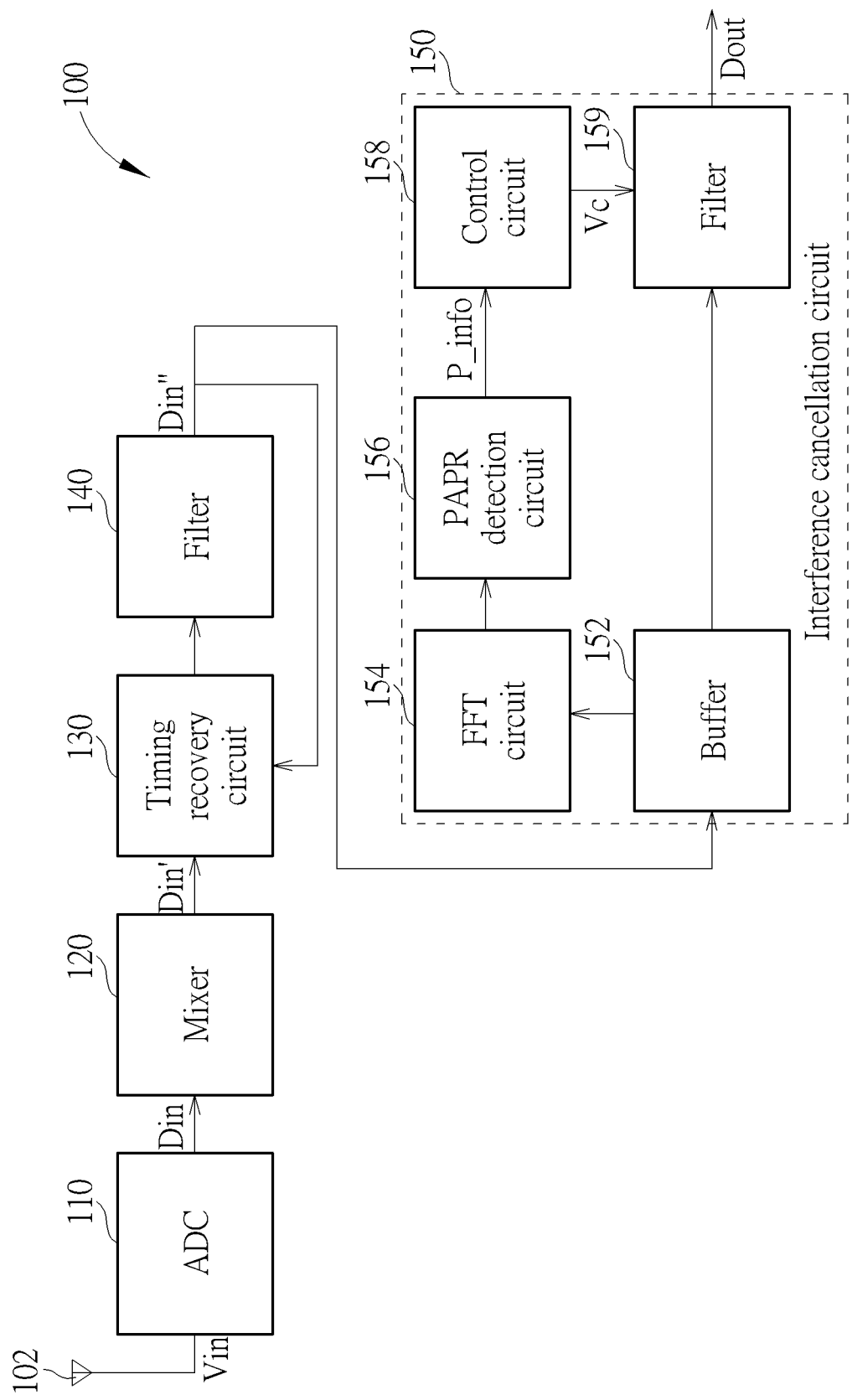
FIG. 1 is a diagram illustrating a circuit according to one embodiment of the present invention.

FIG. 1 is a diagram of a circuit 100 according to one embodiment of the present invention. As shown in FIG. 1, the circuit 100 comprises an antenna 102, an analog-to-digital converter (ADC) 110, a mixer 120, a timing recovery circuit 130, a filter 140 and an interference cancellation circuit 150, wherein the interference cancellation circuit 150 comprises a buffer 152, a fast Fourier transform (FFT) circuit 154, a PAPR detection circuit 156, a control circuit 158 and a filter 159. In this embodiment, the circuit 100 can be applied to a demodulator, such as a demodulator set in a television or a set-top box.

In the operation of the circuit 100, firstly, the ADC 110 receives an analog input signal Vin from the antenna 102, and performs an analog-to-digital conversion operation on the analog input signal Vin to generate a digital input signal Din. The mixer 120 performs a mixing operation (i.e. frequency down-converted operation) to generate a mixed signal Din'. The timing recovery circuit 130 performs an interpolation operation on the mixed signal Din' to generate an interpolated signal, and the filter 140 filters the interpolated signal to generate a signal Din", wherein the filter 140 may be a square root raised cosine (SRRC) filter. It should be noted that the operations of the front-end circuits such as the ADC converter 110, the mixer 120, the timing recovery circuit 130 and the filter 140 are well known to those having ordinary knowledge in the art, and the present invention focuses on the interference cancellation circuit 150, so the details of the operations of the above elements are omitted here.

In the operation of the interference cancellation circuit 150, the buffer 152 sequentially receives the signal Din" from the filter 140, and temporarily stores the signal Din". When amount of data stored in the buffer 152 reaches a block that can be processed by the FFT circuit 154, the FFT circuit 154 performs a FFT operation on the block to obtain a spectrum of the block. Then, the PAPR detection circuit 156 calculates a PAPR according to the spectrum of the block, and generates a detection result P_info accordingly. In one embodiment, the detection result P_info comprises a position of a peak when the PAPR of the block is greater than a threshold value (e.g. the position of the peak is a frequency corresponding to the peak). In detail, if the PAPR of the block is lower than the threshold value, the detection result P_info indicates that the block does not have single-tone interference; and if the PAPR of the block is greater than the threshold value, the detection result P_info indicates that the block has single-tone interference and provides the position of the peak of the block.

After receiving the detection result P_info, the control circuit 158 can determine whether to generate a control signal Vc to adjust the filtering frequency point (e.g. center of the filter band) of the filter 159 according to the detection result P_info. Specifically, if the detection result P_info indicates that the block does not have single-tone interference, the control circuit 158 may generate the control signal Vc so that the filter 159 does not filter the effective content of the block from the buffer 152. If the detection result P_info indicates that the block has single-tone interference, and the peak position of the block is the same as the current filtering frequency point, the control circuit 158 may not need to generate the control signal Vc to change the filtering frequency point of the filter 159, or the control circuit 158 generates the control signal Vc to maintain the current filtering frequency point of the filter 159. If the detection result P_info indicates that the block has single-tone interference, and the peak position of the block is different from the current filtering frequency point, the control circuit 158 generates the control signal Vc to change/adjust the filtering frequency point of the filter 159.

In one embodiment, in order to prevent the filtering frequency point of the filter 159 from being changed inappropriately by accidental errors in the detection circuit, the control circuit 158 may have a confirmation mechanism to avoid the above situation. Specifically, the control circuit 158 may continually receive the detection results P_info corresponding to a plurality of consecutive blocks, and only when the detection results of all of the plurality of consecutive blocks indicate that the single-tone interference exists and detection results provide the same or nearby peak positions, the control signal Vc is generated to change the filtering frequency point of the filter 159.

Figure 2:
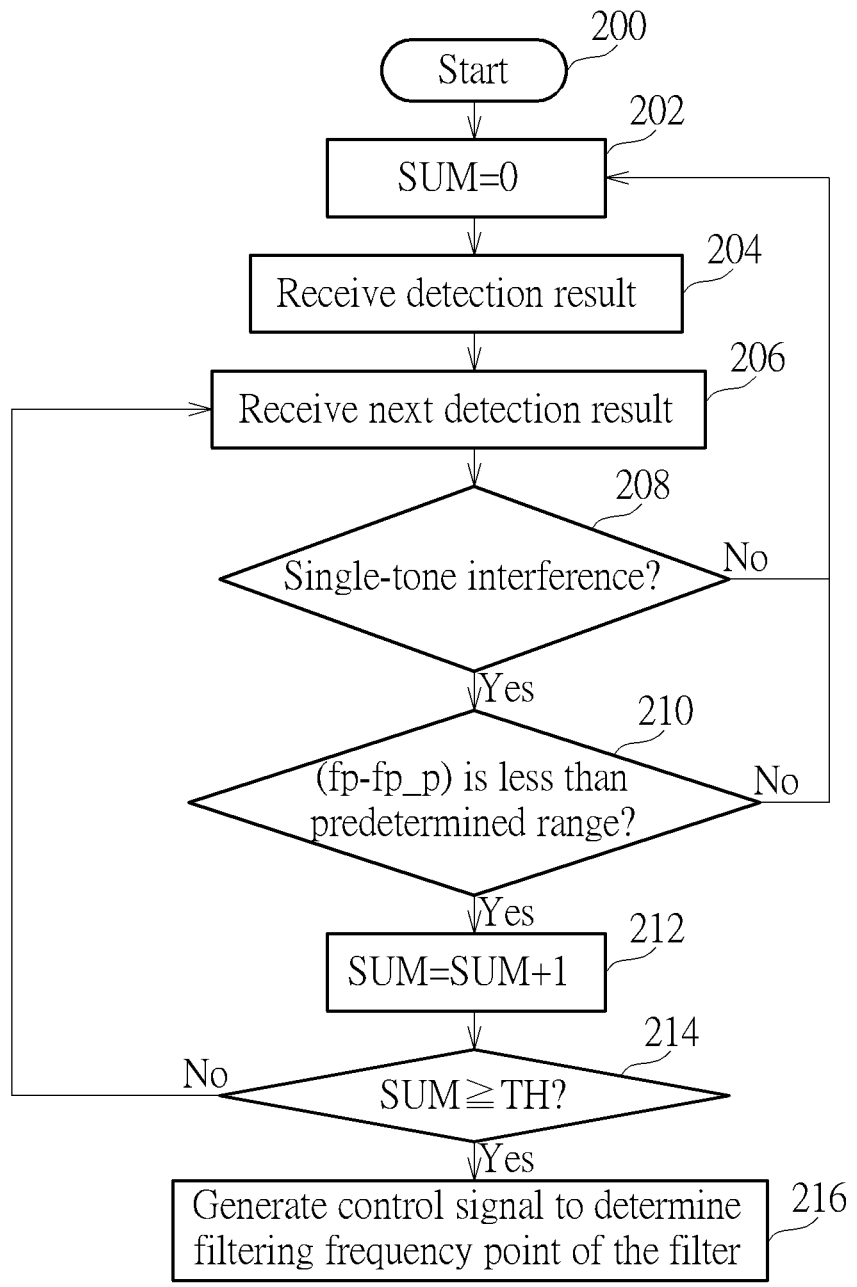
FIG. 2 is a flowchart of a confirmation mechanism of a control circuit according to one embodiment of the present invention.

For example, referring to a flowchart of the confirmation mechanism of the control circuit 158 shown in FIG. 2, in Step 200, the flow starts. In Step 202, a parameter SUM is set to zero. In Step 204, the control circuit 158 receives the detection result P_info generated by the PAPR detection circuit 156, and it is assumed that the detection result P_info indicates that the block has single-tone interference and provides the peak position of the block. In Step 206, the control circuit 158 receives the next detection result P_info from the PAPR detection circuit 156. In Step 208, the control circuit 158 determines whether the detection result P_info received in Step 206 has single-tone interference, if yes, the flow enters Step 210; and if not, the flow goes back to Step 202. In step 210, the control circuit 158 determines whether a difference between the peak position fp of the block included in the detection result P_info and the peak position fp_p of the previous block included in the previous detection result P_info is within a predetermined range, for example, the predetermined range can be 5 kHz; if yes, the flow enters Step 212; and if not, the flow enters Step 202. In step 212, the control circuit 158 increments the parameter SUM by one. In Step 214, the control circuit 158 determines whether the parameter SUM reaches a threshold value TH, if yes, the flow enters Step 216; if not, the flow goes back to Step 206. In step 216, the control circuit 158 refers to the peak position of the block included in the detection result(s) P_info (e.g., referring to the peak position of the block included in the last detection result P_info received, or referring to the peak position of at least one block included in the detection results P_info received), to generate the control signal Vc to adjust the filtering frequency point of the filter 159.

Figure 3:
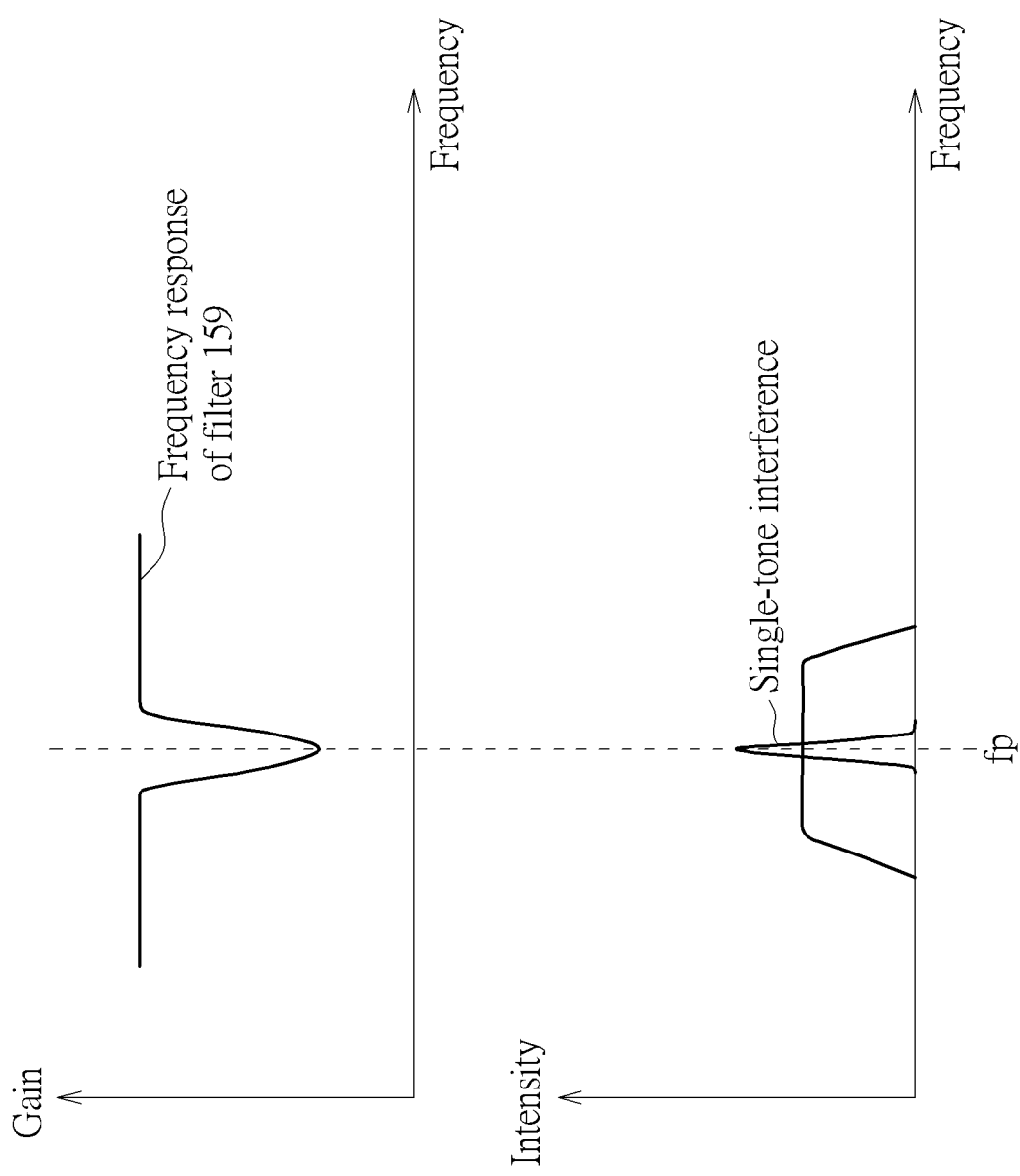
FIG. 3 is a diagram of a frequency response of the filter and signal including single-tone interference.

Regarding the operation of the filter 159, the filter 159 may be an Infinite Impulse Response (IIR) band-rejection filter, and the filter 159 may have multiple tap coefficients that can be set/adjusted. The control circuit 158 can generate the control signal Vc to control the filter 159 to use different tap coefficients to have different filtering frequency points to filter out single-tone interference in the signal Din". Referring to the diagram of the frequency response of the filter 159 and the signal Din" including the single-tone interference shown in FIG. 3, by moving the filtering frequency point of the filter 159 to the peak position fp of the signal Din", the filter 159 can effectively eliminate the single-tone interference in Din" to generate a clean output signal Dout.

Figure 4:
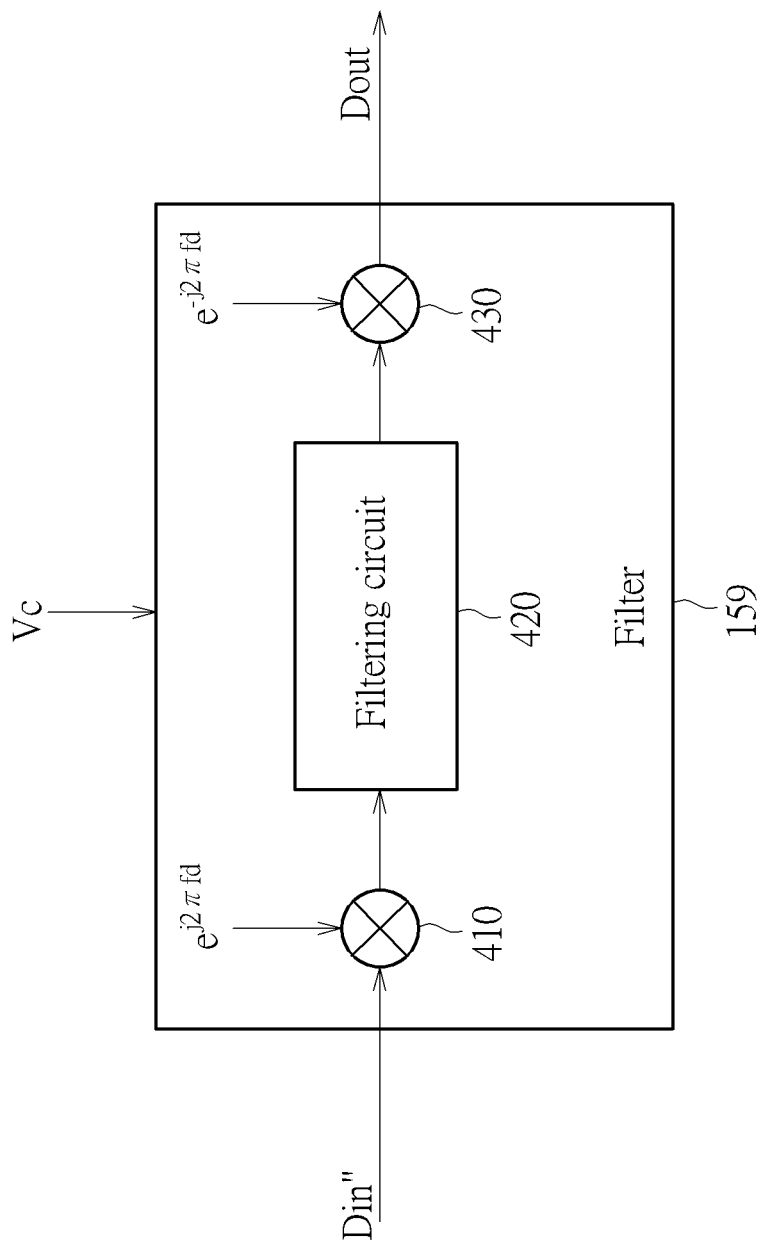
FIG. 4 is a diagram illustrating a filter according to one embodiment of the present invention.
Figure 5:
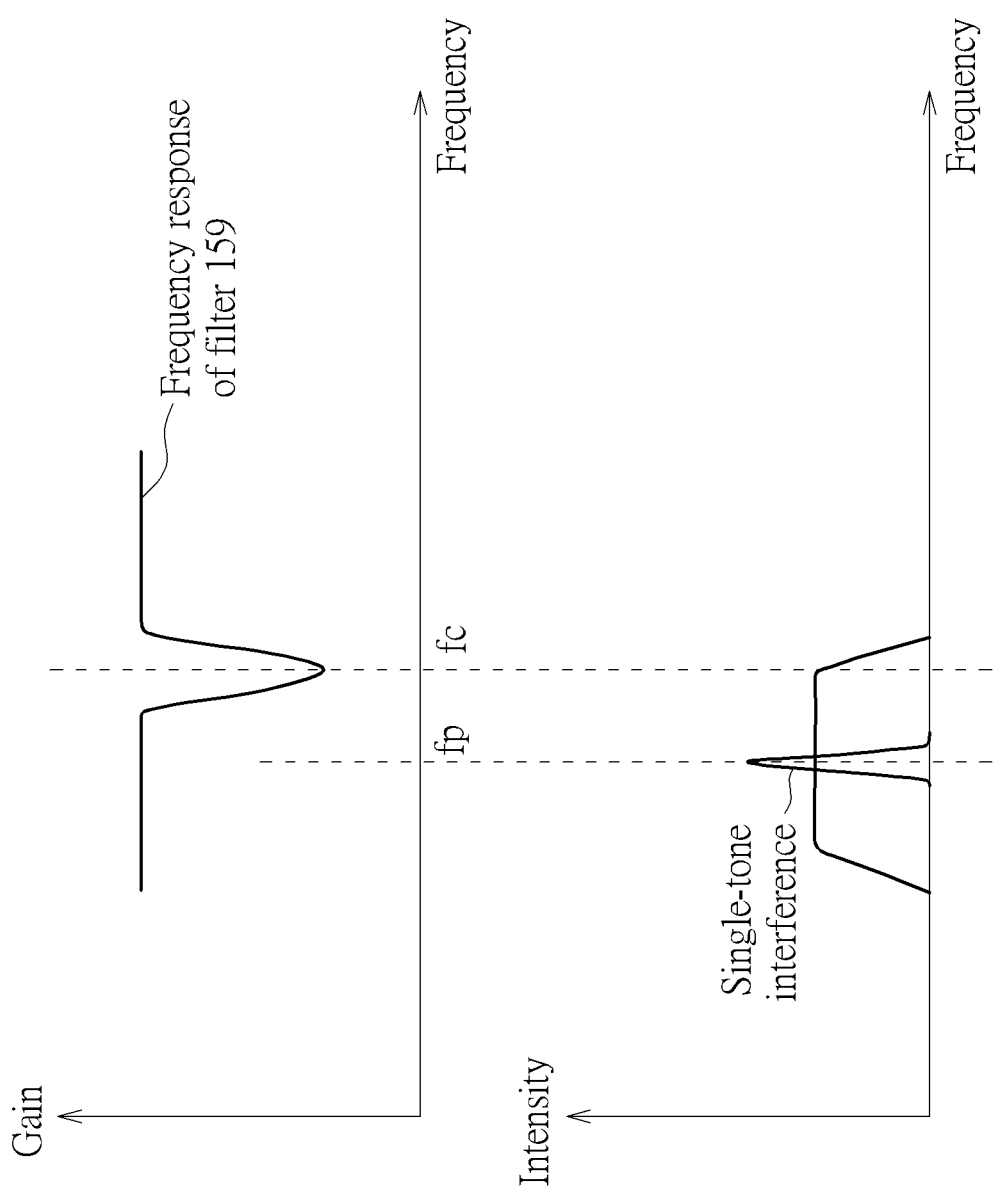
FIG. 5 is a diagram of a frequency response of the filter shown in FIG. 4 and signal including single-tone interference.

However, although the change/adjustment of filtering frequency point of the filter 159 can be completed by changing the tap coefficients, its overall speed is not fast, and the effect of single-tone interference cancellation may be affected when the frequency of single-tone interference changes rapidly. In another embodiment, the filter 159 may further include two complex multipliers, and the single-tone interference cancellation may be achieved by changing the frequency of Din". Specifically, referring to a diagram of the filter 159 shown in FIG. 4 and a diagram of the frequency response of a filtering circuit 420 and the single Din" including the single-tone interference shown in FIG. 5, the filter 159 includes a first complex multiplier 410, the filtering circuit 420 and a second complex multiplier 430, where the filtering frequency point of the filtering circuit 420 does not change due to the detection result. For example, the filtering circuit 420 has a fixed filtering frequency point fc. In the operation of the filter 159 shown in FIG. 4, the control circuit 158 or the filter 159 determines a difference fd between filtering frequency point fc of the filter 159 and the peak position fp of the signal Din" to determine a factor $e^{j2\pi fdt}$, that is, the first complex multiplier 410 is used to shift the frequency of the signal Din" to the right by the difference fd so that the peak position fp of the signal Din" is aligned with the filtering frequency point fc of the filtering circuit 420 to generate a frequency-shifted signal. Then, the filtering circuit 420 filters the frequency-shifted signal to remove the single-tone interference of the signal Din" to generate a filtered signal. Finally, the second complex multiplier 430 uses the factor $e^{-j2\pi fdt}$ to shift the frequency of filtered signal to the left by the difference fd so that the signal Din" returns to the original frequency band to generate the output signal Dout.

In the above embodiment, the PAPR detection circuit 156 and the control circuit 158 are continually operating, that is, the interference cancellation circuit 150 can detect whether there is single-tone interference in the signal Din" in real time and quickly and effectively eliminate/suppress this single-tone interference.

Figure 6:
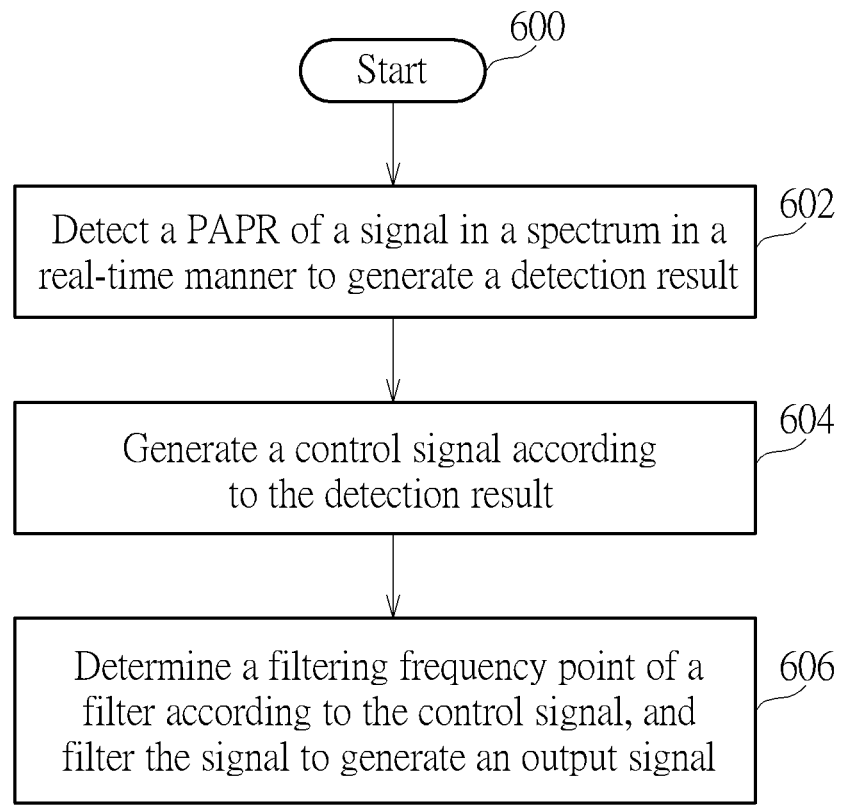
FIG. 6 is a flowchart of an interference cancellation method according to one embodiment of the present invention.

FIG. 6 is a flowchart of an interference cancellation method according to one embodiment of the present invention.

Step 600: the flow starts.

Step 602: detect a PAPR of a signal in a spectrum in a real-time manner to generate a detection result.

Step 604: generate a control signal according to the detection result.

Step 606: determine a filtering frequency point of a filter according to the control signal, and filter the signal to generate an output signal.

Briefly summarized, in the interference cancellation circuit and the interference cancellation method of the present invention, by detecting whether the current signal has single-tone interference is a real time manner, and dynamically adjusting the filtering frequency point according to the frequency of the detected single-tone interference, this single-tone interference can be quickly and effectively eliminated/suppressed to improve the signal quality.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An interference cancellation circuit, comprising:
a peak-to-average power ratio (PAPR) detection circuit, configured to detect a PAPR of a signal in a frequency spectrum in a real-time manner to generate a detection result, wherein the detection result comprises a frequency corresponding to a peak of the signal in the frequency spectrum;
a control circuit, coupled to the PAPR detection circuit, configured to generate a control signal according to the detection result; and
a filter, coupled to the control circuit, configured to determine a filtering frequency point of the filter according to the control signal, and to filter the signal to generate an output signal;
wherein the control circuit determines whether the signal has single-tone interference according to the detection result, and generates the control signal to determine the filtering frequency point of the filter, so as to filter the single-tone interference of the signal to generate the output signal;
wherein the PAPR detection circuit detects the PAPR on the spectrum of consecutive blocks of the signal in the real time manner to generate a plurality of detection results; and only when the control circuit determines that all of the blocks have the single-tone interference according to the plurality of detection results, and a frequency of the single-tone interference is different from the filtering frequency point of the filter, the control circuit generates the control signal to change the filtering frequency point of the filter.

2. The interference cancellation circuit of claim 1, wherein the detection result comprises at least the PAPR, and the control circuit determines whether the signal has the single-tone interference by determining whether the PAPR is greater than a threshold value.

3. The interference cancellation circuit of claim 1, wherein the control circuit generates the control signal according to the detection result so that the filtering frequency point of the filter corresponds to the frequency of the peak, to filter the single-tone interference of the signal to generate the output signal.

4. The interference cancellation circuit of claim 1, wherein the filter adjusts a plurality of tap coefficients of the filter according to the control signal to determine the filtering frequency point, and filters the signal to generate the output signal.

5. An interference cancellation circuit, comprising:
a peak-to-average power ratio (PAPR) detection circuit, configured to detect a PAPR of a signal in a frequency spectrum in a real-time manner to generate a detection result, wherein the detection result comprises a frequency corresponding to a peak of the signal in the frequency spectrum;
a control circuit, coupled to the PAPR detection circuit, configured to generate a control signal according to the detection result; and
a filter, coupled to the control circuit, configured to determine a filtering frequency point of the filter according to the control signal, and to filter the signal to generate an output signal;
wherein the filter comprises:
a first complex multiplier, configured to multiply the signal by a first factor to generate a frequency-shifted signal, wherein the first factor is generated according to the detection result;
a filtering circuit, configured to filter the frequency-shifted signal to generate a filtered signal; and
a second complex multiplier, configured to multiply the filtered signal by a second factor to generate the output signal.

6. The interference cancellation circuit of claim 5, wherein if the detection result indicates that the signal has a single-tone interference, the first complex multiplier multiplies the signal by the first factor to make the filtering frequency point of the filtering circuit is equal to a frequency of the single-tone interference, to generate the frequency-shifted signal.

7. The interference cancellation circuit of claim 6, wherein the filtering frequency point of the filtering circuit does not change according to the detection result, the second factor is generated according to the detection result, and the second complex multiplier multiples filtered signal by the second factor to generate the output signal with the same frequency band as the signal.

8. An interference cancellation method, comprising:
detecting a peak-to-average power ratio (PAPR) of a signal in a frequency spectrum in a real-time manner to generate a detection result, wherein the detection result comprises a frequency corresponding to a peak of the signal in the frequency spectrum;
generating a control signal according to the detection result; and
determining a filtering frequency point of a filter according to the control signal, and filtering the signal to generate an output signal; and
wherein the step of determining the filtering frequency point of the filter according to the control signal comprises:
multiplying the signal by a first factor to generate a frequency-shifted signal, wherein the first factor is generated according to the detection result;
using a filtering circuit filtering the frequency-shifted signal to generate a filtered signal; and
multiplying the filtered signal by a second factor to generate the output signal.

9. The interference cancellation method of claim 8, wherein the step of generating the control signal according to the detection result comprises:
determining whether the signal has single-tone interference according to the detection result; and
the step of filtering the signal to generate the output signal comprises:
filtering the single-tone interference of the signal to generate the output signal.

10. The interference cancellation method of claim 9, wherein the detection result comprises at least the PAPR, and the step of determining whether the signal has the single-tone interference according to the detection result comprises:
determining whether the signal has the single-tone interference by determining whether the PAPR is greater than a threshold value.

11. The interference cancellation method of claim 9, wherein the step of filtering the single-tone interference of the signal to generate the output signal comprises:

controlling the filter so that the filtering frequency point of the filter corresponds to the frequency of the peak, to filter the single-tone interference of the signal to generate the output signal.

12. The interference cancellation method of claim 9, further comprising:

detecting the PAPR on the spectrum of consecutive blocks of the signal in the real time manner to generate a plurality of detection results; and the step of generating the control signal according to the detection result comprises:

generating the control signal to change the filtering frequency point of the filter only when it is determined that all of the blocks have the single-tone interference according to the plurality of detection results, and a frequency of the single-tone interference is different from the filtering frequency point of the filter.

13. The interference cancellation method of claim 8, wherein the step of determining the filtering frequency point of a filter according to the control signal, and filtering the signal to generate the output signal comprises:

adjusting a plurality of tap coefficients of the filter according to the control signal to determine the filtering frequency point, and using the filter to filter the signal to generate the output signal.

14. The interference cancellation method of claim 8, wherein the step of multiplying the signal by the first factor to generate the frequency-shifted signal comprises:

if the detection result indicates that the signal has a single-tone interference, multiplying the signal by the first factor to make the filtering frequency point of the filtering circuit is equal to a frequency of the single-tone interference.

15. The interference cancellation method of claim 14, wherein the filtering frequency point of the filtering circuit does not change according to the detection result, and the step of multiplying the filtered signal by the second factor to generate the output signal comprises:

generating the second factor according to the detection result; and multiplying the filtered signal by the second factor to generate the output signal with the same frequency band as the signal.

\* \* \* \* \*